(12) United States Patent
Nesseth

(10) Patent No.: US 7,637,541 B2
(45) Date of Patent: Dec. 29, 2009

(54) GATE ASSEMBLY

(75) Inventor: Clint Nesseth, Cameron, WI (US)

(73) Assignee: NTH Inc., Barron, WI (US)

( * ) Notice: Subject to any disclaimer, the term of this patent is extended or adjusted under 35 U.S.C. 154(b) by 15 days.

(21) Appl. No.: 11/496,730

(22) Filed: Jul. 31, 2006

(65) Prior Publication Data

US 2007/0052249 A1    Mar. 8, 2007

Related U.S. Application Data

(63) Continuation-in-part of application No. 11/196,777, filed on Aug. 3, 2005, now abandoned.

(51) Int. Cl.
*E05C 3/06* (2006.01)
*E05C 19/00* (2006.01)

(52) U.S. Cl. ............... 292/196; 292/253; 292/302; 292/DIG. 13; 49/326

(58) Field of Classification Search ........... 292/340, 292/196, 97, DIG. 71, 264, 300, 253, DIG. 13, 292/DIG. 29, 288, 302, 262, DIG. 32, DIG. 36, 292/336.3, 163, 164, 173; 49/326, 357, 394; 256/224–26, 73, DIG. 4

See application file for complete search history.

(56) References Cited

U.S. PATENT DOCUMENTS

| | | | | |
|---|---|---|---|---|
| 131,043 A * | 9/1872 | Wooster | ...................... | 49/326 |
| 484,847 A * | 10/1892 | Clary | ...................... | 49/326 |
| 741,539 A * | 10/1903 | Peeples | ...................... | 49/326 |
| 979,689 A * | 12/1910 | Ormiston | ...................... | 49/326 |
| 1,268,427 A | 6/1918 | Blunt | | |
| 1,277,334 A * | 8/1918 | Miller | ...................... | 49/326 |
| 2,618,876 A * | 11/1952 | Goode | ...................... | 49/160 |
| 2,661,555 A | 12/1953 | Hoppe | | |
| 3,419,302 A * | 12/1968 | Frey et al. | ............... | 292/189 |
| 3,828,475 A | 8/1974 | Eblen | | |
| 3,896,588 A * | 7/1975 | Doffin et al. | ............. | 49/394 |

OTHER PUBLICATIONS

Co-Line Metal Stamping, Sure-Latch Lockable Two-Way Livestock Gate Latch (Model #R-158-2L), dated 2000-2003, 1 Page.
HiQual U.S.A., Gates, Copyright 2002, Printed on Feb. 6, 2006, 3 Pages.

* cited by examiner

*Primary Examiner*—Carlos Lugo
*Assistant Examiner*—Alyson M Merlino
(74) *Attorney, Agent, or Firm*—Merchant & Gould P.A.

(57) ABSTRACT

The present invention relates to a gate assembly that can be configured to reduce the vulnerability of the gate to operation by a horse. In an embodiment, a lever operator is configured to extend above the head of a rider, such that a rider can reach up to operate the lever to open the gate. A configuration is illustrated wherein the operator lever moves relative to the gate as the gate opens and closes for providing full access through the gate area when the gate is open.

7 Claims, 15 Drawing Sheets

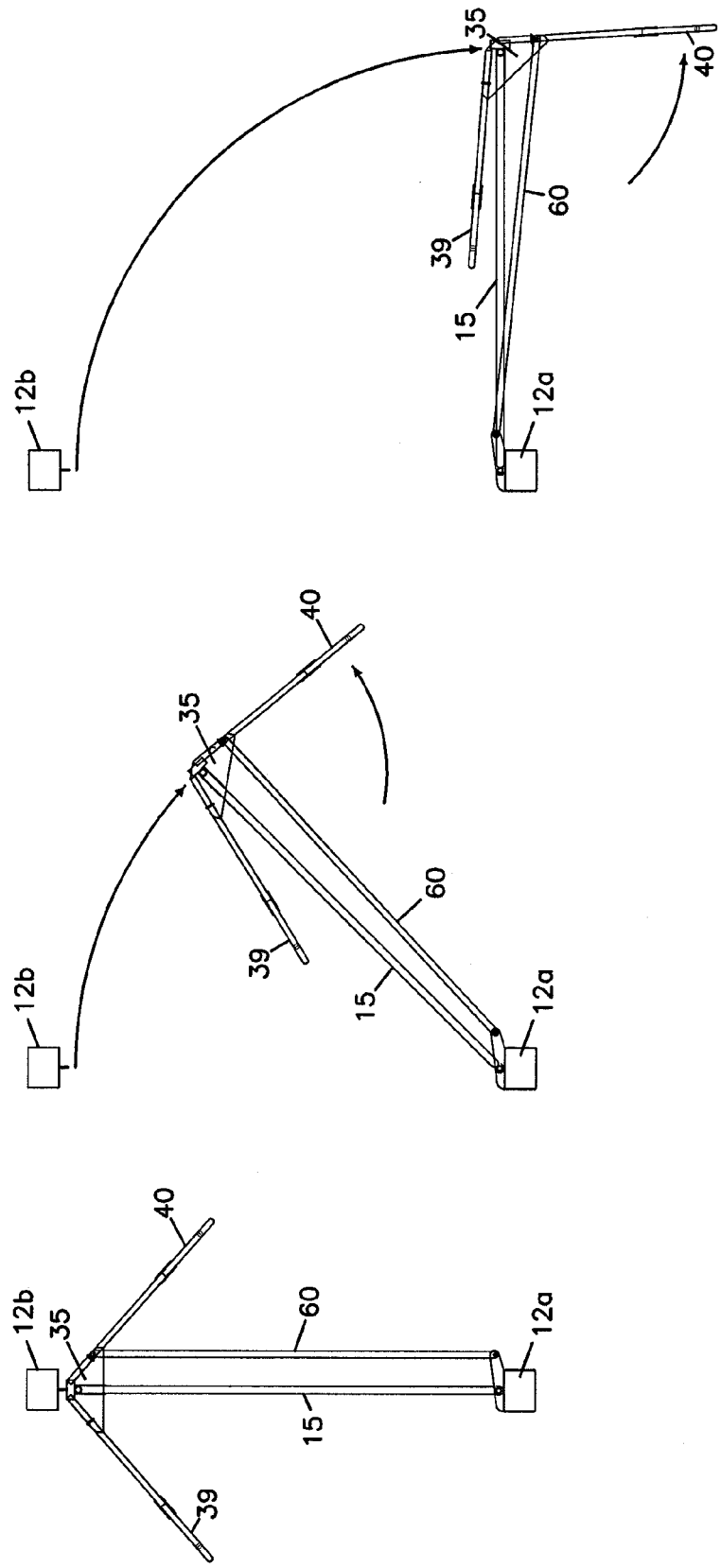

GATE ASSEMBLY

CROSS REFERENCE TO RELATED APPLICATIONS

This is a Continuation-in-Part of U.S. patent application Ser. No. 11/196,777, filed Aug. 3, 2005 now abandoned.

FIELD OF THE INVENTION

The present invention relates to a gate assembly, and more particularly to a mechanically operable gate assembly that is operable by a person mounted on an animal or riding a recreational vehicle, and which is configured so as not to be operable by animals or wild life.

BACKGROUND OF THE INVENTION

Fence and gate systems can be used to corral animals, such as horses or livestock. Typically, a gate system is provided to allow passage by persons, vehicles, riders on horseback, or others. A gate assembly generally includes some kind of latch and/or lock mechanism that allows the gate to be selectively opened. For example, a gate assembly may be configured with a hand-operated latch.

There is a need for being able to easily open a gate in a fence while riding on an animal or vehicle, without having to dismount from the animal or vehicle to activate the gate latch apparatus. For example, when riding a horse or an all-terrain-vehicle (ATV), or even a tractor, it is inconvenient to dismount, open the gate, remount and ride through the gate, and possibly dismount again to reclose the gate. This need is particularly true for range gates of fences such as those found in pastures, corrals, or the like. Further, since such gates are generally open to the environment and typically not easily serviceable, it is desirable that such gate opening mechanism be rugged and mechanically operable, requiring no electrical power. A further requirement for such gate operation mechanisms is that they not impede movement through the opening vacated by the gate when opened, and that they not be susceptible to unauthorized or inadvertent opening by animals or wild life. Horses, for example, are particularly adept at learning how to pull on ropes or to operate exposed latches for gates. Improved such gate assemblies are needed.

The present invention addresses the above gate operator needs. The present invention provides a simple and reliable gate assembly that has a gate release assembly that can be easily operated by a rider of a horse or open vehicle without requiring the rider to dismount from his horse or vehicle. The inventive gate release assembly is of rugged construction that can withstand environmental elements, requires little maintenance, and cannot be readily activated by a horse or other wildlife. These and other features of the invention will become apparent upon a more detailed description thereof.

SUMMARY OF THE INVENTION

This invention provides a gate and a gate operating assembly therefore, that enables ready operation by a rider of a horse or open vehicle. The gate operating assembly has an operating activation member that can be positioned above the normal horse head height, but yet be within easy reach of a person riding upon a horse. Exertion of a small activating force releases the gate latch and allows the gate to be pushed open and later re-closed, all while still mounted on a horse or vehicle. The operating mechanism can be configured to be operable from either side of the gate, and can be configured to cooperatively move relative to the gate as the gate opens, so as to allow unobstructed rider access through the open gate area. The gate configuration can be constructed for connection to existing gate fence posts, or can include a self-contained frame construction that requires support mounting to only a single fence post.

According to one aspect of the invention, there is provided a gate release assembly including a support structure that is configured to support a lever. The support structure can be coupled to a gate. The gate release assembly also includes a latch control mechanism that is coupled to the support structure. The latch control mechanism can be operatively coupled to the latch such that activation of the latch control mechanism selectively releases the latch. The latch control mechanism can be configured to be unreachable by a horse standing on four legs but is configured such that a rider on a horse can reach the latch control mechanism to release the latch. The latch control mechanism can include a lever that can be operatively coupled to the latch with a chain, such that pulling down on the lever pulls up on the chain to raise the latch.

According to another aspect of the invention, there is provided a gate latch assembly including a latch mechanism that is configured to be coupled to a gate and to a structure in the vicinity of the gate. The latch mechanism is configured to releasably couple the gate to the structure. The gate latch assembly also includes a latch control mechanism that is configured to release the latch mechanism to allow the gate to move with respect to the structure. The latch control mechanism further can be configured to be positioned such that the latch control mechanism cannot be reached by a horse.

According to yet another aspect of the invention there is provided a gate including a gate assembly, a latch mechanism, and a latch control mechanism. The gate assembly includes first and second frame members and a swinging gate member. The gate member has first and second ends, the first end of the gate member being pivotably coupled to the first frame member. The latch mechanism can be configured to couple the second end of the gate member to the second frame member, to restrain pivotal movement of the gate member with respect to the frame members. The latch control mechanism can be operatively coupled to the latch mechanism and can include a lever mechanism that is configured so that it can be actuated by a rider on horseback. The lever mechanism can be positioned at a height relative to the ground so as to be out of reach or a horse that is standing on four legs.

According to another aspect of the invention there is provided a gate latch release mechanism including a lateral arm that is configured to be rotatably coupled to a gate, and a lever arm that is pivotably coupled to the lateral arm. The lever arm can be configured to be coupled to a latch mechanism such that the latch mechanism can be released by pivoting the lever arm. The gate latch release mechanism can be mounted on or near a gate. When the gate latch release mechanism is mounted on a gate, the lateral arm and lever arm extend outwardly on a first side of the gate. The lateral arm and lever arm can be configured to rotate toward the gate as the gate opens.

According to another aspect of the invention, there is provided a gate release assembly including a latch control mechanism with a lever, wherein pushing up on the lever releases the latch of the gate. The latch control mechanism includes a handle that is coupled to the lever via a loose mechanical connection such that the handle cannot be used to push up on the lever unless the connection between the lever and the handle is first stiffened. The lever can be positioned at a height relative to the ground so as to be out of reach of a horse standing on four legs and the handle can be positioned at a height relative to the ground so as to be reachable by a horse standing on four legs. The handle may be coupled to the lever in such a way that the horse cannot use the handle to push up on the lever, whereas a human can use the handle to push up on the lever. The handle may be configured such that it hangs down from the lever in a generally vertical direction and such that it can freely swing relative to the lever in all directions.

These and other features of the invention will become apparent to those skilled in the art upon a more detailed description of several preferred embodiments of the invention.

BRIEF DESCRIPTION OF THE DRAWINGS

Referring to the Drawing, wherein like numerals represent like parts throughout the several views:

FIG. 8 is a diagrammatic top view of the gate assembly of FIG. 1, illustrating the gate and operator handle positions thereof as they would appear when the gate is in a closed position;

FIG. 9 is a diagrammatic top view of the gate assembly of FIG. 1, illustrating the gate and operator handle portions thereof as they would appear when the gate is in a partially open position;

FIG. 10 is a diagrammatic top view of the gate assembly of FIG. 1, illustrating the gate and operator handle portions thereof as they would appear when the gate is in a fully open position;

DETAILED DESCRIPTION OF THE PREFERRED EMBODIMENT

The invention includes a gate assembly having an improved gate release apparatus with an elevated operator handle that can be activated by a person mounted on an animal such as a horse, or while sitting in or on a vehicle such as an ATV or tractor, without requiring the person to dismount from the animal or the vehicle. The gate assembly can include a framework that is self-supporting, or it can be configured for mounting to an existing gate and gate support posts. The invention further provides for a gate latch and latch activation assembly that is configured so as to not be readily operable by animals intended to be restrained by the gate, or by wildlife.

While the present invention will be described with respect to particular types of gate and frame configurations, it will be understood that the invention is not to be limited by such configurations, or to the materials disclosed for such items. Further, while the invention is described with respect to particular embodiments of the invention, including preferred embodiments of operator latch activations structures, it will be understood that the invention is not to be limited to the use of such latch activation structures or to the types of latches shown in the preferred embodiments. Those skilled in the art will recognize that the principals of the invention extend beyond the specifics of the assemblies and structures illustrated in the disclosed preferred embodiments. Such preferred embodiments are presented for illustration purposes only and to show specific examples of how the inventive principals can be applied to actual use applications.

Figure 1:
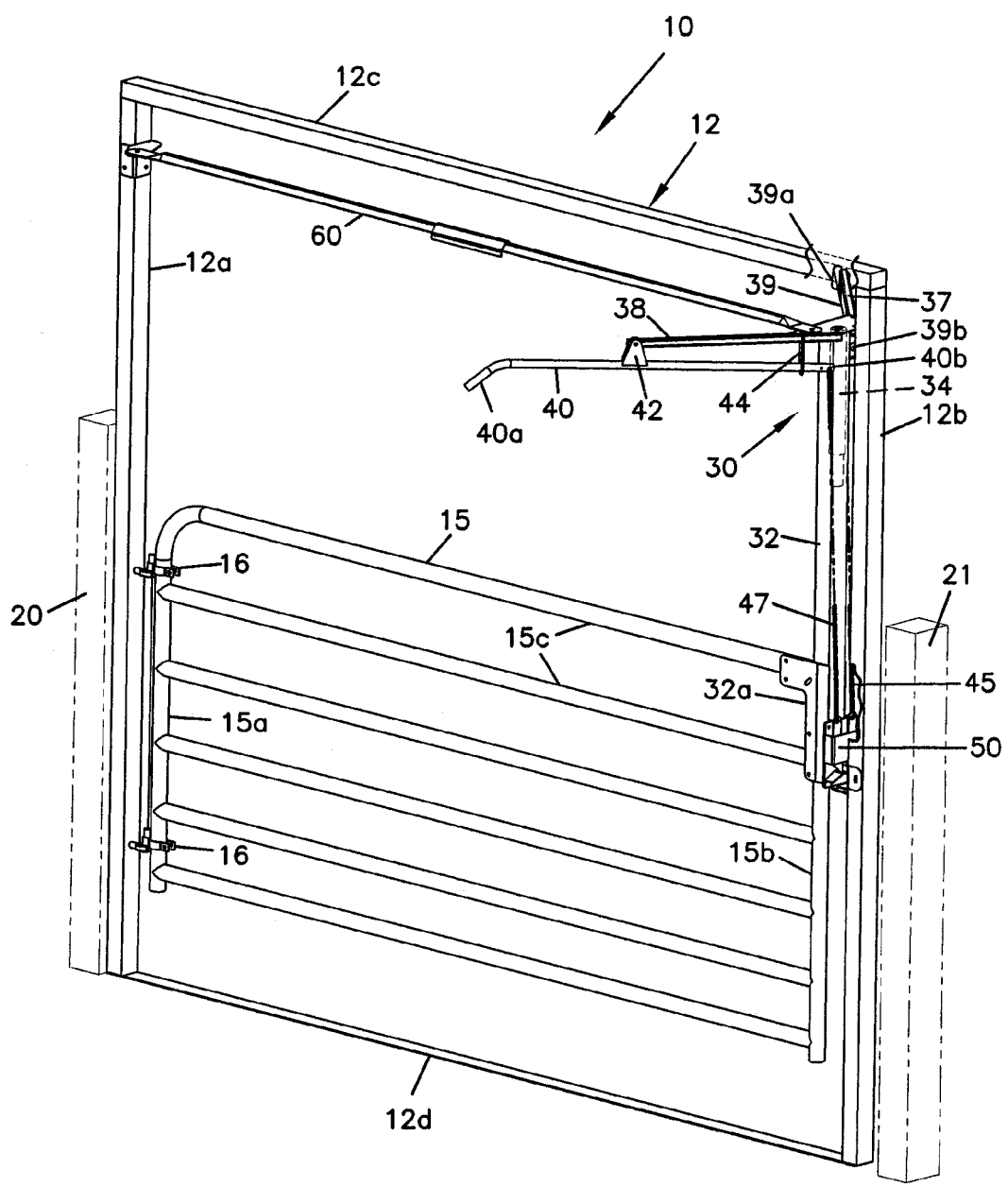
FIG. 1 is a perspective view of a first embodiment of a gate assembly that incorporates the principles of the invention.

Referring to FIG. 1, a first embodiment of a gate assembly which incorporates the principals of this invention is generally disclosed at 10. The gate assembly of the first embodiment includes a rectangular support frame 12. In the preferred embodiment the frame 12 is of tubular construction. As illustrated in FIG. 1, the support frame 12 has left and right upright support members 12a and 12b, and top and bottom cross bar members 12c and 12d. The support frame 12 provides a support structure for a gate 15 and its associated latching structure hereinafter described, for situations wherein the gate assembly can be connected to a single existing support post of a fence (not illustrated). As illustrated in FIG. 1, the gate 15 has a left upright end member 15a and a right upright member 15b interconnected by a plurality of lateral bar members, generally indicated at 15c. In the first embodiment, the left upright member 15a of the gate 15 is secured to the left upright 12a of the support frame 12 for pivotal, rotational movement relative thereto by a pair of gate hinges 16. The hinges allow rotation of the gate through a 180° angle. The gate assembly 10 is configured for secure mounting of the left frame upright member 12a to a fixed fence post 20 by appropriate securing means such as U-bolts, support straps or the like (not illustrated) so as to provide a strong foundation for supporting the pivotal motion of the gate relative thereto.

The support frame 12 and supported gate are configured to extend between the fixed post 20 and other appropriate fence structure such as the second fence post 21 illustrated in FIG. 1, to close a gap in the fence. When a gate assembly uses a full support frame such as 12, it is not necessary to physically connect the right upright standard 12b of the support frame 12 to the other fence structure such as the second post 21, as long as the left upright support frame standard 12a is securely mounted to the fixed post 20. The second fence structure piece, however, should be located in close enough proximity to the right upright standard 12b of the support frame 12 such that the animals being retained by the fence/gate structure cannot pass between the fence portion 21 and the right upright member 12b of the support frame 12. In certain instances, it may be desirable to directly affix the fence to the right upright support member 12b as well as to the left upright support member 12a. In the preferred embodiment, the top and bottom cross bar members 12c and 12d of the support frame 12 are spaced by 115 inches, to provide adequate height for most horse/rider combinations to freely pass therebetween when riding through the support frame when the gate is open. It will be appreciated that the top/bottom cross bar interspacing dimension can be varied to accommodate the particular use to which the gate is put. The support frame 12 can be installed relative to a fence such that the bottom rail either lies above the ground surface, or is imbedded within the ground so as to not be exposed to traffic passing through the gate. The gate width dimension is also a matter of design choice. Typical gate widths would be 6, 8, or 10 feet; however, wider gate widths could be used.

Figure 2:
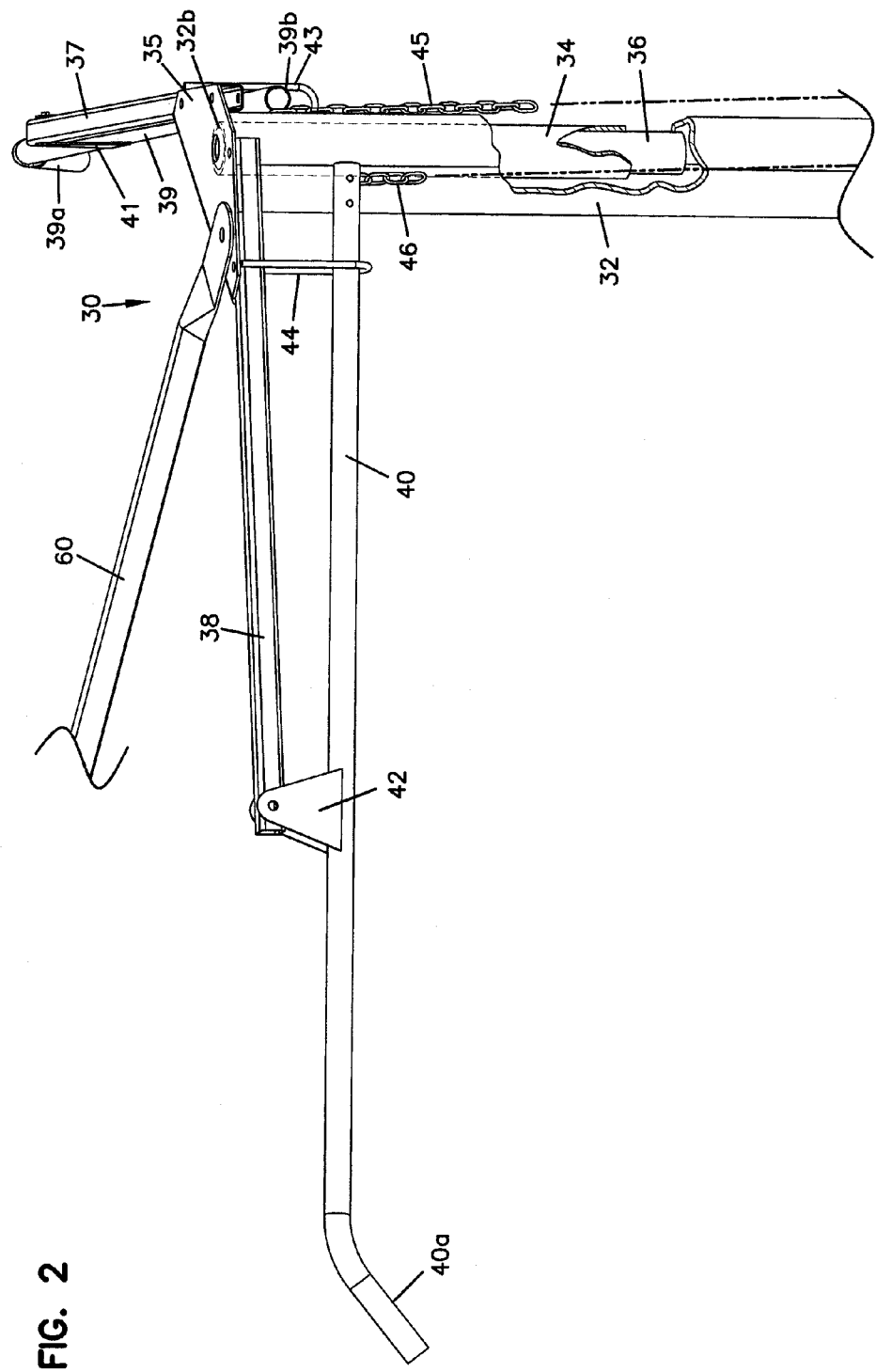
FIG. 2 is an enlarged perspective view of the pivotal operator handle portion of the gate assembly of FIG. 1.

Referring to FIGS. 1 and 2, the gate 15 supports a gate release assembly, generally illustrated at 30. The gate release assembly includes an upright channel shaped mast member 32 configured for cooperative attachment to the right upright member 15b of the gate such that the upright mast member 32 is securely affixed to and moves with the distal end of the gate above the hinges 16. The open channel portion of the upright mast member 32 is sized to cooperatively slide over the right upright member 15b of the gate 15 in snug mating relation as illustrated in FIG. 1, and has a fastening flange portion 32a adjacent its lower end which can be bolted to the right upright member 15b and lateral bars 15c of the gate, as indicted in FIG. 1. Fastening bolts are not illustrated in the drawing. The upright mast member 32 extends generally vertically upward from the distal end of the gate; however, the upright mast member need not be vertical, but could be angled off of vertical by as much as 15° or more. The mast member 32 extends upwardly from the gate to a distal end, generally indicated at 32b. In general, the upright mast member 32 is secured to the gate 15 in a manner such that its upper distal end 32b is at a height such that the operator control levers (hereinafter described) are positioned at a vertical height so as to be out of reach of a horse or other animal that may operate the gate release assembly when walking thereunder. In particular, the gate release assembly would be configured so that a typical standing or walking horse cannot reach the control mechanism with its mouth when in a standard walking or standing (all four legs on the ground) position. Similarly, the height of the upright mast member 32 is low enough such that the gate release assembly 30 can readily be reached and operated by a rider on horseback.

A guide pipe segment 34 is secured within the upright mast member 32 and longitudinally extends down the mast member from the distal end. One or more of such guide pipe segments may be secured within the mast member 32 and axially aligned with one another, to form a rotatable guide assembly about the longitudinal axis of the guide pipe 34. The distal end 32b of the mast member 32 terminates at a point below the top cross bar 12c of the support frame 12 to allow for free pivoting motion of an operator control mechanism, as hereinafter described in more detail.

The operator control mechanism of the gate release assembly 30 is pivotally attached at the distal end 32b of the upright mast member 32. Referring to FIGS. 1 and 2, a pivot bracket plate 35 is secured to a pivot rod or pipe 36 which downwardly depends in generally vertical manner from, and cooperatively pivotally rides within the outer guide pipe 34. The upper end of the guide pipe 34 forms a bearing surface upon which the pivot bracket plate 35 rides. The pivot rod or pipe 36 is coaxially aligned with the outer guide pipe 34 such that the pivot bracket plate 35 pivotally rotates about the common axes of the pivot rod 36 and outer guide pipe 34 in a plane generally perpendicular to the common axes.

First and second lever support arms 37 and 38 respectively are fixedly secured at first ends thereof to opposite edges of the pivot bracket plate 35 and longitudinally extend outwardly therefrom toward their distal ends, forming generally a right angle therebetween (as viewed from above). In a preferred embodiment, the lever support arms 37 and 38 generally extend in a horizontal plane; however, they need not be horizontal but could extend at angles of 15° or more off of a horizontal plane. First and second lever arms 39 and 40 are respectively pivotally connected by first and second pivot brackets 41 and 42 respectively to the distal ends of the first and second lever support arms 37 and 38. Those ends of the lever arms 39 and 40 which extend longitudinally beyond the distal ends of the lever support arms 37 and 38 are curved to define handles 39a and 40a respectively of the first and second lever arms 39 and 40. The opposite ends 39b and 40b of the lever arms 39 and 40 pivotally rotate about the distal ends of the lever support arms 37 and 38 as restrained by U-shaped arm retainer members 43 and 44 respectively. As viewed in FIGS. 1 and 2, the loop-shaped arm retainer members define the extent of vertical travel of the ends 39b and 40b of the lever arms 39 and 40. The upper ends of the arm retainer members 43 and 44 are secured to the pivot bracket plate 35 about the first and second lever support arms 37 and 38, such that the lever arm 39 is generally aligned with its lever support arm 37, and the lever arm 40 is generally aligned with its lever support arm 38. In the preferred embodiment illustrated, the pivotal end 39b of the first lever arm 39 has a downwardly depending chain member 45 affixed for movement therewith, and the pivoting end 40b of the second lever arm 40 has a downwardly depending chain 46 affixed thereto for movement therewith. While chain members 45 and 46 have been illustrated with respect to the preferred embodiment of the invention, it will be understood that other types of connecting members such as rods, cables, ropes or the like could also be used to form a linkage between the lever support arms and a latch member as hereinafter described in more detail.

The pivotable ends 39b and 40b of the operator lever arms 39 and 40 are operatively coupled by means of the chain linkage members 45 and 46 respectively to a latch assembly 50. While the latch assembly 50 can assume many different configurations, in a preferred embodiment, the latch used is one sold by Co-Line Welding, Inc. under its SURE-LATCH brand, referred to as a Two-Way Livestock Gate Latch, model R-158-2 (a non-lockable version), or under model R-158-2L (a lockable version). The latch allows release of the gate to swing in either direction and helps prevent the gate end from sagging or swinging. The latch assembly 50 generally includes a first latch portion 50a having first and second liftable latch members 51, 52 that cooperatively engage a generally horizontal post member 53 of a second latch portion 50b. The first and second liftable latch members 51, 52 cooperatively retainably engage the horizontal post member 53 which is sized to retainably fit between the liftable latch members when disposed in a downward, locked position. The liftable latch members 51, 52 are independently vertically movable within the chassis of the first latch portion 50a to selectively latch or unlatch the gate, relative to the latch post member 53. In the preferred embodiment, the first latch portion 50a is secured to the upright mast member 32 and thus to the gate for movement therewith, and the post member 53 of the second latch portion 50*b* is secured to the right upright 12*b* of the support frame 12 which does not move with the gate.

Figure 3:
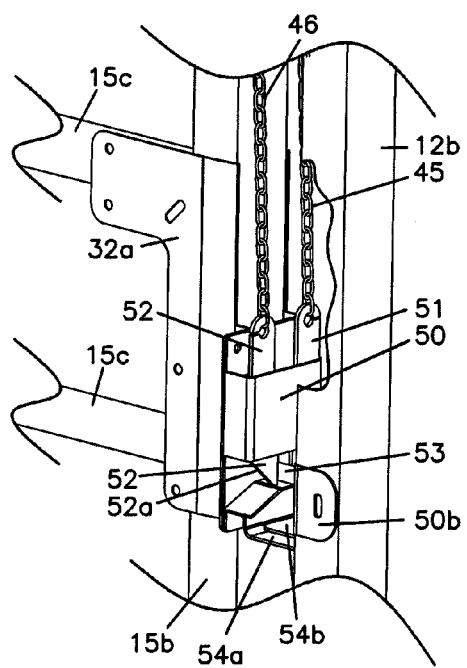
FIG. 3 is an enlarged perspective view of the latch portion of the gate assembly of FIG. 1, illustrated in a first, latched configuration.
Figure 4:
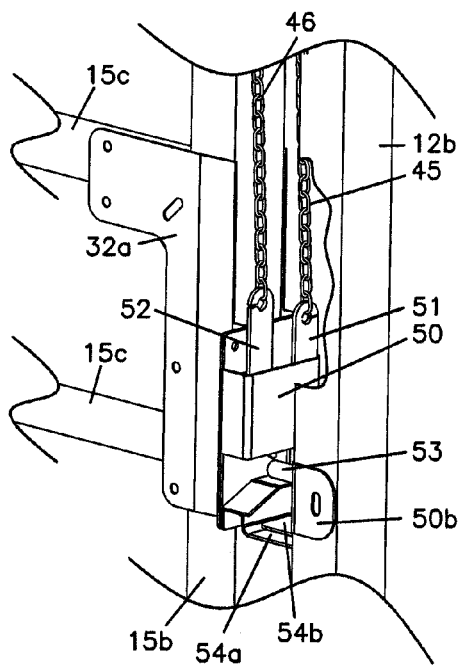
FIG. 4 is an enlarged perspective view of the latch portion of the gate assembly of FIG. 1, illustrated in a second, unlatched configuration.

When in a latched mode, the liftable latch members will be disposed in a lowered position as illustrated in FIG. 3, with their inner edges retainably engaging the outer circumference of the latch post member 53. When in an unlatched position, at least one of the liftable members 51, 52 will be disposed in a raised position, such as illustrated in FIG. 4, out of contact with the post member 53 so as to enable relative movement of the post under the raised latch member, allowing the gate to move in a direction away from the raised latch member. The moveable latch members 51 and 52 are respectively connected to the linkage chains 45, 46, which are respectively moved in upward lifting directions by pivotal motion of the operator levers 39 and 40 respectively. The outer lower edges of the liftable latch members 51, 52 are beveled in camming manner which cause the liftable members to be cammed upwardly and thus lifted when the outer cam surfaces reengage the post member 53 as the gate swings back toward a latched position during a closing operation of the gate. The beveled camming surface of the lifting member 52 is shown in FIG. 3 at 52*a*.

Figure 5:
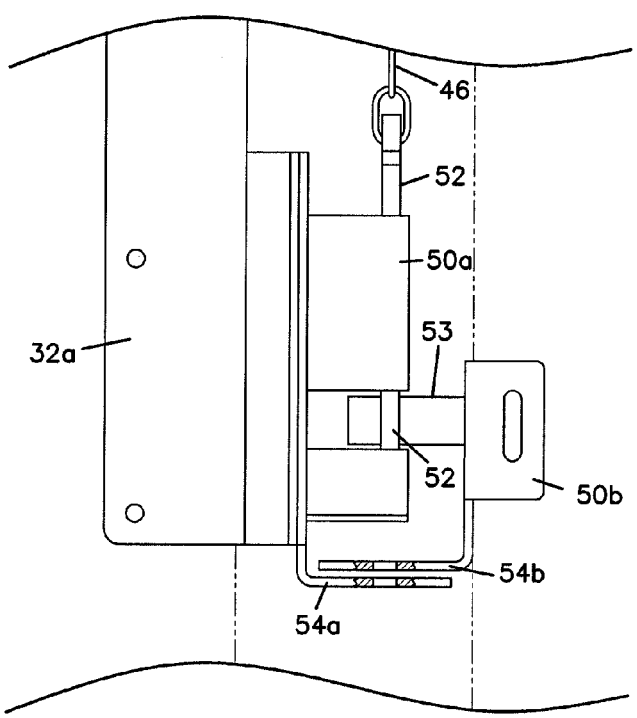
FIG. 5 is an enlarged perspective view of the latch portion of the gate assembly of FIG. 1, illustrating the locking portion thereof.

In a preferred embodiment of the invention, the latch assembly 50 is further configured to provide the gate with a locking capability, as for example for locking the gate with a padlock or other type of pin configuration. The lock members are illustrated at 54*a* and 54*b* in FIGS. 3, 4 and 5. Locking member 54*a* forms an extension of the first latch portion 50*a* and is affixed to the end of the gate 15. Locking member 54*b* forms an extension of the second latch portion 50*b* and is secured to the right upright 12*b* of the support frame 12. In their simplest form, the lock members 54*a* and 54*b* comprise overlapping flange extensions of the first and second latch portions 50*a* and 50*b* respectively with vertically aligned holes formed therethrough for cooperatively accepting a locking pin, padlock or the like, in a manner well-known in the art.

It will be appreciated by those skilled in the art, that alternative latch structures can be used within the spirit and intent of this invention. For example, a latch that includes a rod that turns to open a latch instead of a cam that is lifted over a pin could be used. Other structures are also possible and can be configured for use with the present inventive gate release assembly. Further, while the operable latch assembly portion 50*a* has been shown as affixed to the movable gate, and the horizontal post member assembly 50*b* being connected to the immovable frame, the relative mounting structure of the latch assembly portions could be reversed.

In the preferred embodiment, the gate release assembly 30 includes a pivot control mechanism for pivoting the operating lever arms 39 and 40 out of the way of an advancing horse and rider as the gate pivots in an opening direction, and to return the operating lever arms to their accessible positions as illustrated in FIGS. 1 and 2, when the gate recluses. The pivot control mechanism basically comprises a retainer arm 60 (FIGS. 1 and 2) pivotally connected at one end to one side of the pivot bracket plate 35, and at its other end to an offset bracket connected to the left upright 12*a* of the support frame 12. The height position along the left upright 12*a* at which the retainer arm 60 is secured can be vertically adjusted to accommodate the vertical height of the gate release assembly. The pivot control mechanism represented by the retainer arm arrangement causes the operator levers 39 and 40 and their respective support arms 37 and 38 respectively to move toward the plane of the gate as the gate opens on that side of the gate that is closest to the person operating the gate.

This movement is illustrated diagrammatically in FIGS. 8-10. Referring thereto, FIG. 8 illustrates the top view, the operator levers 39 and 40 as they would appear in angular position relative to the gate, when the gate is in a closed position. In such position, the operator levers form equal angles with the gate. FIG. 9 illustrates the positioning of the operator levers relative to the plane of the gate as the gate moves in an opening direction. The retainer arm 60 causes the pivot bracket plate 35 to rotate about the axis of its pivot rod 36 in a counterclockwise direction (as viewed in FIG. 9) causing the operator lever 39 to rotate closer to the plane of the gate, and the operator lever 40 to rotate away from the plane of the gate. As the gate continues to open toward a fully opened position, as illustrated in FIG. 10, the operator lever 39 which addresses the open gate region is rotated to a position which is closely adjacent to the general plane of the gate 15, and the opposite operator lever 40 has rotated to a position which is nearly perpendicular to the general plane of the gate. As the gate is moved back toward a closed position, the pivot control mechanism and retainer arm 60 will cause the pivot bracket plate 35 to rotate in a clockwise direction, reestablishing the initial position of the operator levers 39 and 40 as shown in FIG. 8.

If the gate is opened in a counterclockwise direction (as viewed from above), the relative operator arm movements will be just opposite to that previously described with respect to rotation of the gate in a clockwise direction about its hinges. The operator handle movement not only serves the function of removing the operator lever from the gate opening area, but also makes the opposite lever (i.e., lever 40 in FIG. 10) more accessible to the person passing through the gate, so that he or she can easily grab the extended lever 40 once he/she has moved through the open gate, and push the gate by the lever 40 back toward a closing position.

Operation of the first embodiment of the gate can be discussed with reference to FIGS. 1-10. Referring thereto, when the gate is disposed in a closed and latched position the gate will appear as in FIGS. 1, 8 and 3, wherein the operator levers 39 and 40 are pivotally positioned in their at rest or neutral positions with their non-handle ends 39*b* and 40*b* being at their lowermost positions as restrained by the arm retainer members 43 and 44. At such positions, the handle portions 39*a* and 40*a* of the operator levers 39 and 40 will be positioned at their uppermost pivotal positions. The linkage chains 45 and 46 will be at their lowermost positions, causing the movable latch members 51 and 52 of the latch assembly 50 to be positioned in their lowermost positions as illustrated in FIG. 3, retainably engaging the latch post member 53, thus securing the gate in latched position. As an operator, for example a rider on a horse, approaches the gate, one of the operator levers 39 or 40 will be available to him/her on that side of the gate from which he/she approaches. If, for example, the operator approaches from that side of the gate on which operator lever 39 is located, he/she need merely to lift an arm and grasp the handle 39*a* of the operator lever 39 to pivotally move the handle in a downward direction. This lever action will cause the attached chain linkage 45 to move upward, thus lifting the liftable latch member 51 of the latch assembly 50, thereby releasing the first latch portion 50*a* from engagement with the post member 53 of the second latch portion 50*b*. The gate is now free to swing open in a clockwise direction as viewed in FIG. 8. The operator need merely pull downward on the operating lever handle 39*a* while simultaneously pushing on the handle to swing the gate in an opening direction and moving the latch configuration out of engaging position. As previously described, as the gate continues to move in an opening direction, the operating lever 39 will move out toward the plane of the gate and out of the way of the rider, enabling unencumbered passage of the rider through the open gate as illustrated in FIG. 10.

When the rider progresses through the gate he can close the gate by grasping the second operating lever 40 and pushing the gate in a counterclockwise direction back toward a closed position. As the gate approaches the closed position the outer cammed surface of the liftable latch member 51 will engage the outer surface of the post member 53, causing the moveable latch member 51 to lift up and over the post member 53. As the post member passes beneath the lifted latch member 51, the post will engage the inner surface of the second liftable latch member 52 and simultaneously the first latch member 51 will drop back down to a latching position, thereby securing the gate in a closed, latched condition. Simultaneously with the closure motion of the gate, the operator handles will be pivoted by the pivot control mechanism and retainer arm 60 back to their latched, neutral position as illustrated in FIG. 8. The operator levers 39 and 40 need not be activated during the closing operation, since the cammed latch liftable members 51 and 52 perform a self-closing and latching function, without operator intervention.

Figure 6:
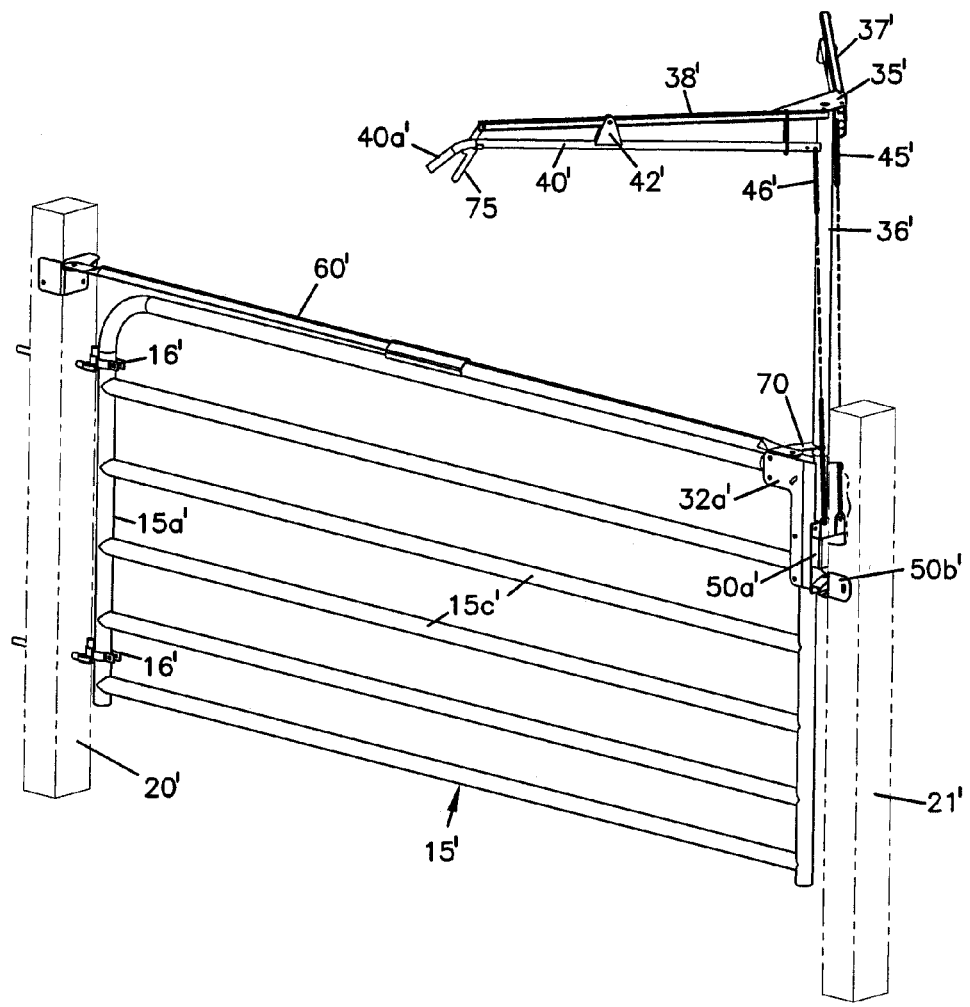
FIG. 6 is a perspective view of a second embodiment of a gate assembly constructed according to the principles of this invention.
Figure 7:
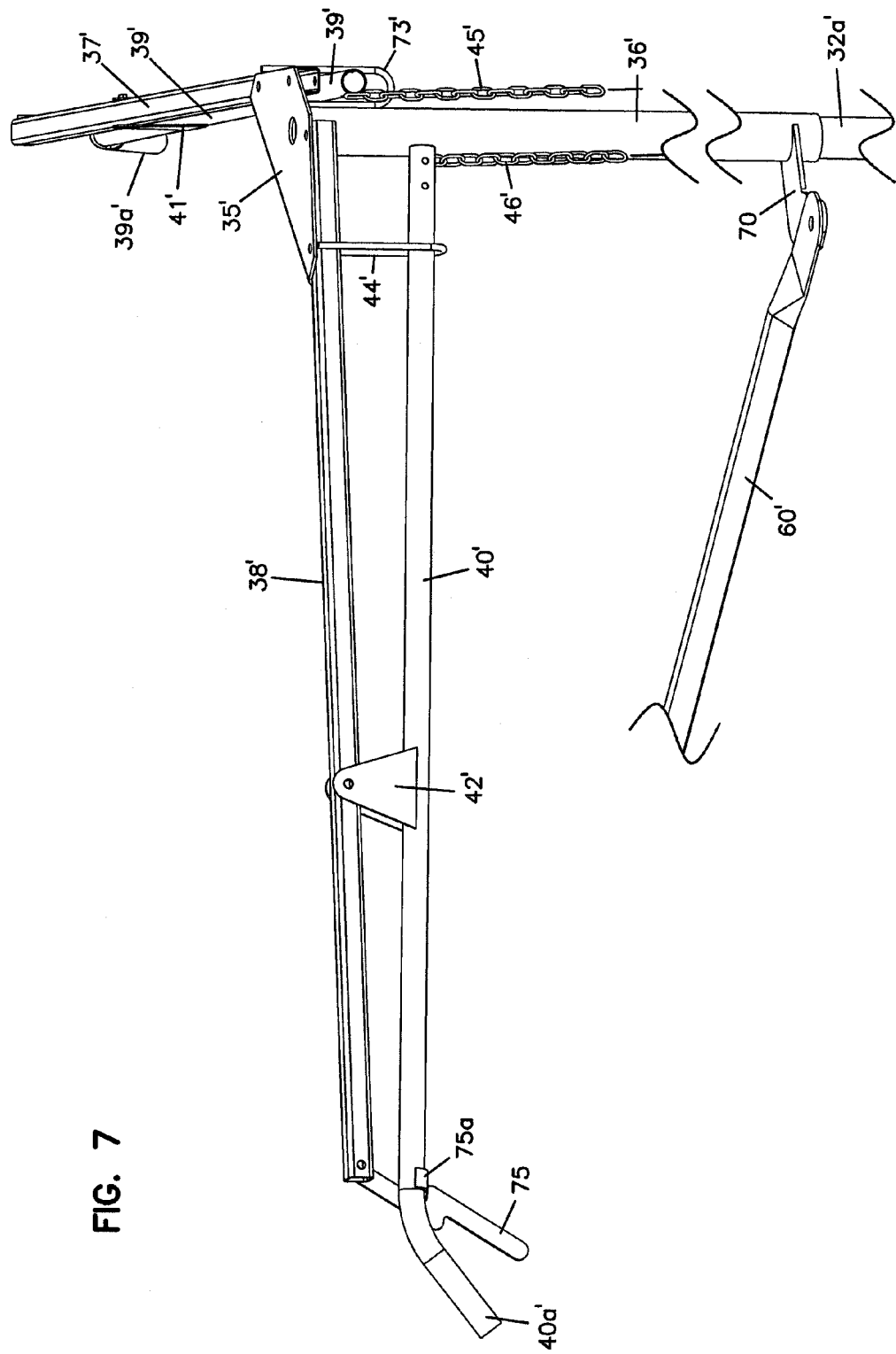
FIG. 7 is an enlarged perspective view of the pivotal operator handle portion of the gate assembly of FIG. 6.

A second embodiment of a gate assembly configured according to the principals of this invention is illustrated in FIGS. 6 and 7. For ease of description, those parts that have already been described and numbered with reference to the first embodiment will retain their respective numbers, with an added prime (') designation. The general configuration and operation of the gate assembly of the second embodiment, parallels that of the first embodiment with several differences. In the second embodiment, the full support frame 12 is not present. The gate 15' is bolted by means of its hinges 16' directly to a support post 20' of the fence. At the distal end of the gate, the latching mechanism 50' operates directly between the gate 15' and a second fixed post 21' of the fence. The horizontal post member 53' of the second latch portion 50b' is connected directly to the fence post 21', and the first latch portion 50a' is connected as with the first embodiment to the moveable end of the gate 15'.

The operator handle assembly is connected to the moveable end of the gate by a lower fastening flange 32a', but the upright channel-shaped mast member of the first embodiment has been removed in favor of the pivot rod 36' which is movably pivotally connected at its lower terminus to the lower fastening flange 32. The upper end of the pivot rod 36' is fixedly connected to and moves with the pivot bracket plate 35'. A pivot tab extension 70 is welded to the outer surface of the pivot rod 36' and rotates therewith about the central axis of the pivot rod 36'. The retainer arm 60' of the pivot control mechanism is pivotally attached at one end to the pivot tab extension 70 and at its other end, directly to the bracket secured to the fence post 20'. The retainer arm 60' acts in the same manner as previously described with respect to the first embodiment, except that instead of being connected to the pivot bracket plate 35' it is connected through the pivot tab extensions 70 directly to the pivot rod 36' to control the rotation of the pivot rod extension 36', and thus the rotational movement of the operator levers 39' and 40' about the longitudinal axis of the extension rod 36'.

The other change reflected in the second embodiment of the invention versus that described for the first embodiment, is that the first and second lever support arms 37' and 38' have been longitudinally extended beyond the pivot brackets 41' and 42' to positions adjacent and overlying the handles 39a' and 40a' respectively. The extended first and second lever support arms 37' and 38' support at their distal ends Z-shaped latch mechanism 75 having a retaining clip 75a. Due to the angles of the lever support arms 37' and 38' illustrated in FIGS. 6 and 7, only one of the retaining latch members 75 is illustrated, it being understood that an identical latch structure is associated with the first lever support arm 37' and its associated lever arm 39'. The retaining members 75a of the handle latch assemblies 75 supportingly engage the lower surfaces of the levers 39' and 40' adjacent their respective handles 39a', 40a'. The handle latch assembly 75 prevents inadvertent pivoting motion of the lever arms 39' and 40' that might unlatch the latch assembly 50'. Such unauthorized motion might, for example, be caused by a larger bird or a small animal such as a squirrel engaging the lever arm handles. In order for an operator to activate the lever arms 39', 40' of the second embodiment, the operator is required to grasp and simultaneously squeeze the lever handle 39a', 40a' at the same time as the handle latch member 75. Such grasping/squeezing motion releases the handle latch assembly and enables the lever arms 39', 40' to pivotally move in latch activating manner, only when specifically authorized by an operator of the gate release assembly. Those skilled in the art will readily appreciate other techniques for achieving additional security of operation of the gate release assembly from unauthorized forces.

A third embodiment of a gate assembly configured according to the principles of this invention is illustrated in FIGS. 11-21. For ease of description, those parts that are similar to the parts that have already been described and numbered with reference to the first two embodiments will retain their respective numbers, with an added double prime (") designation.

Figure 11:
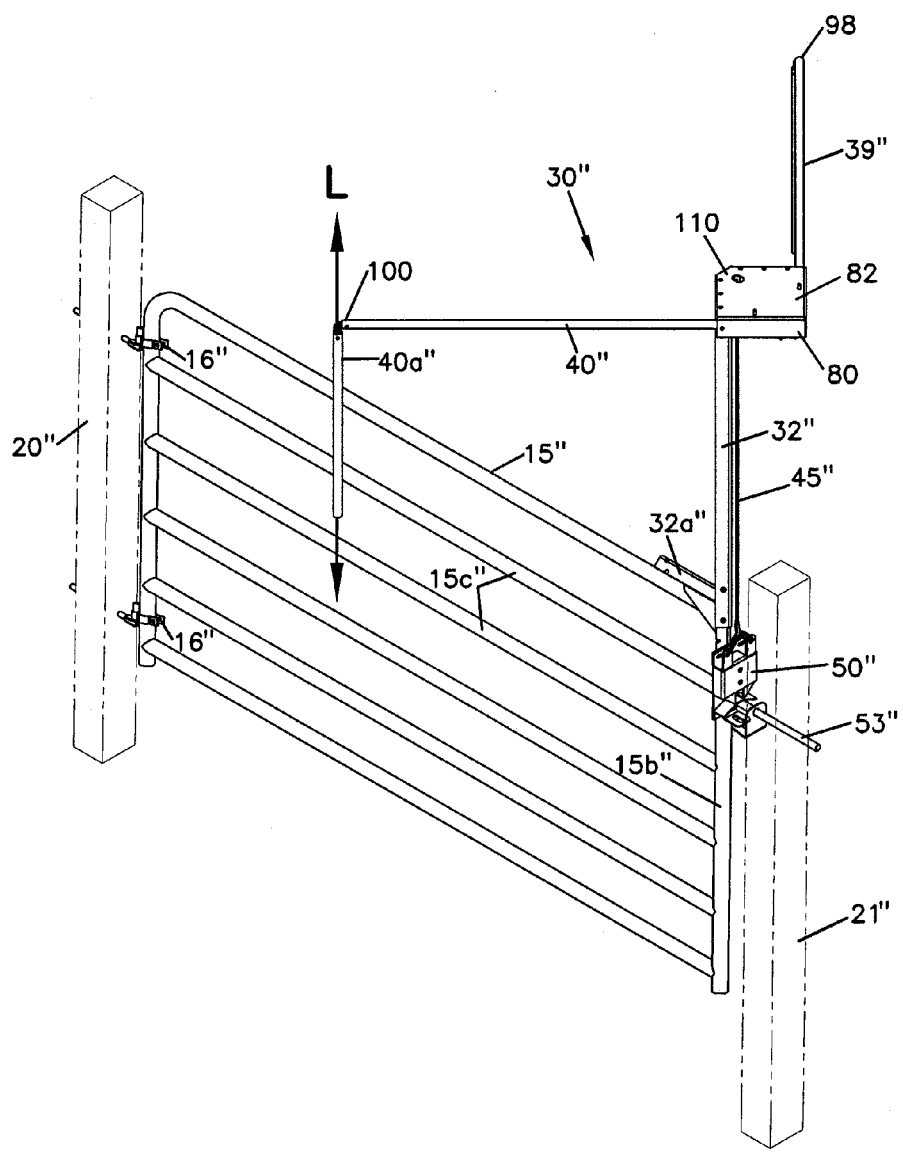
FIG. 11 is a perspective view of a third embodiment of a gate assembly constructed according to the principles of the invention.
Figure 12:
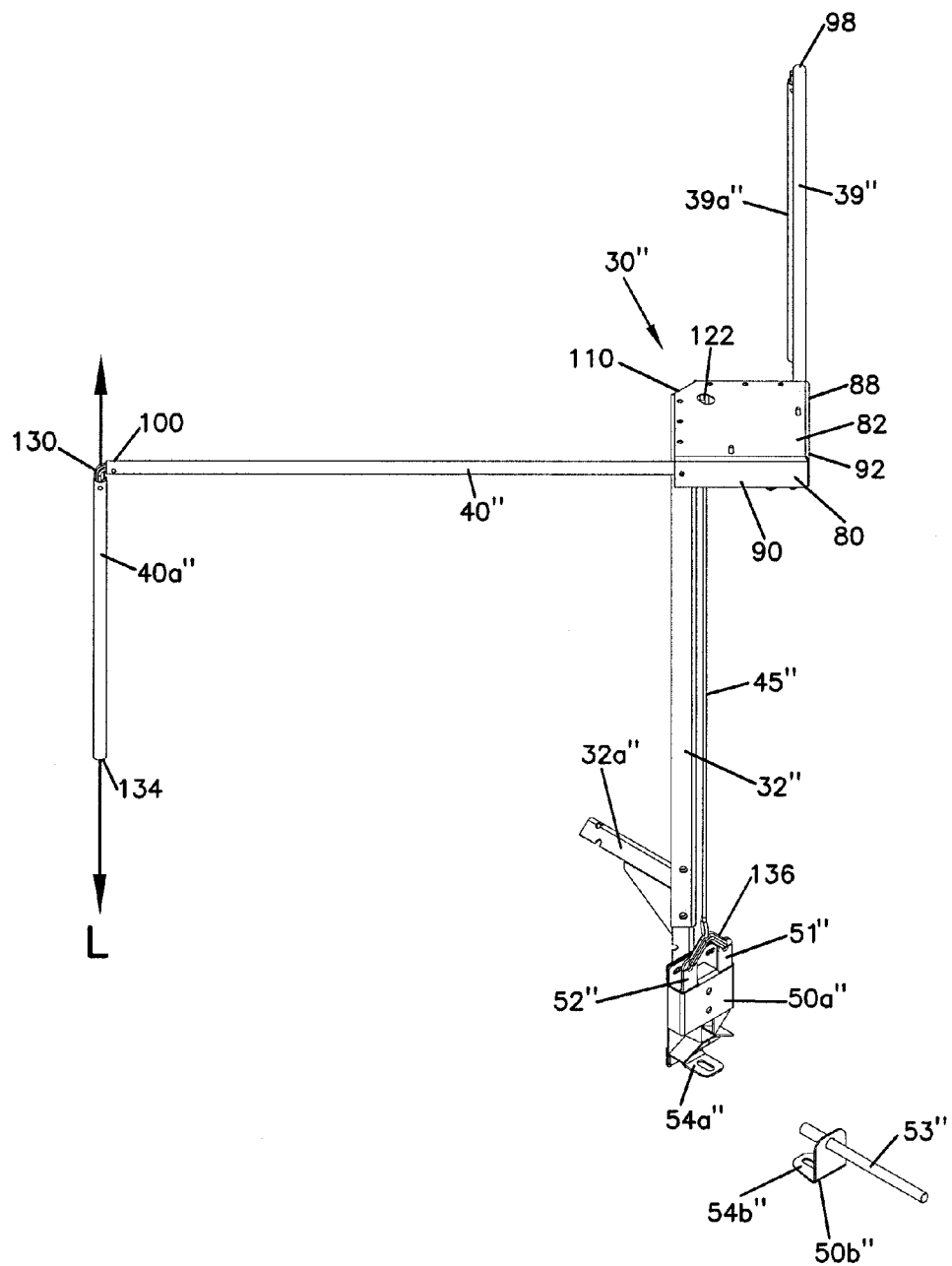
FIG. 12 is a top perspective view of the gate assembly of FIG. 11, the gate assembly shown without the gate and the fence posts.
Figure 13:
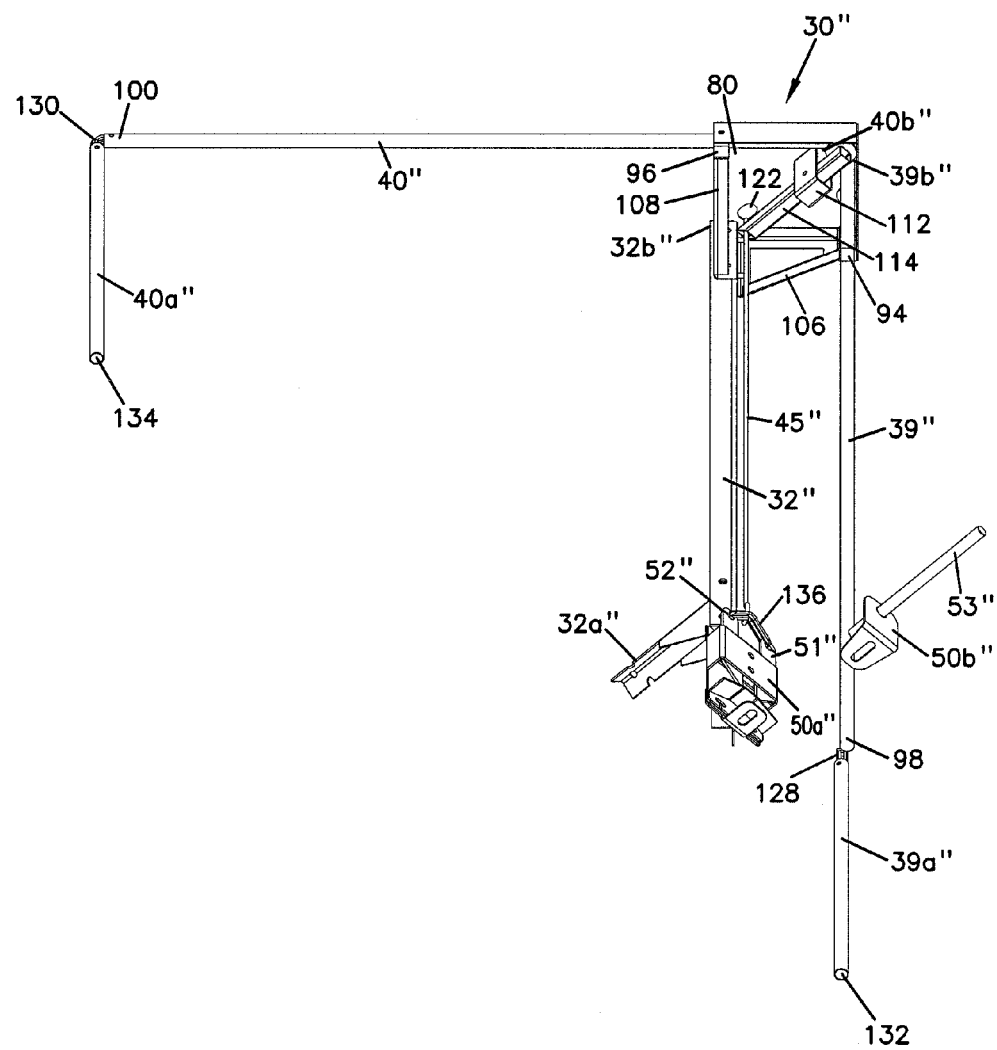
FIG. 13 is a bottom perspective view of the gate assembly of FIG. 12.
Figure 14:
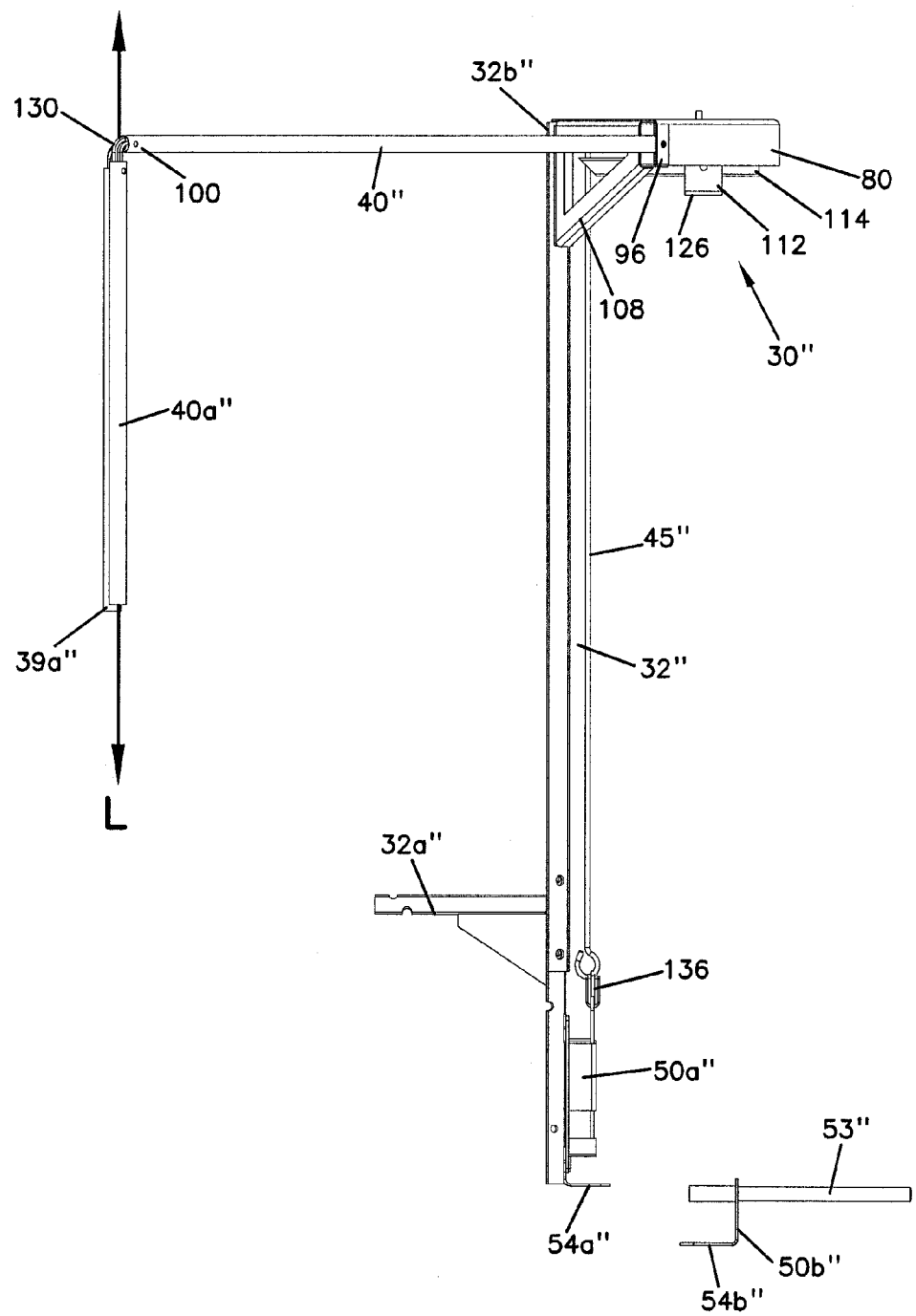
FIG. 14 is a side view of the gate assembly of FIG. 12.
Figure 15:
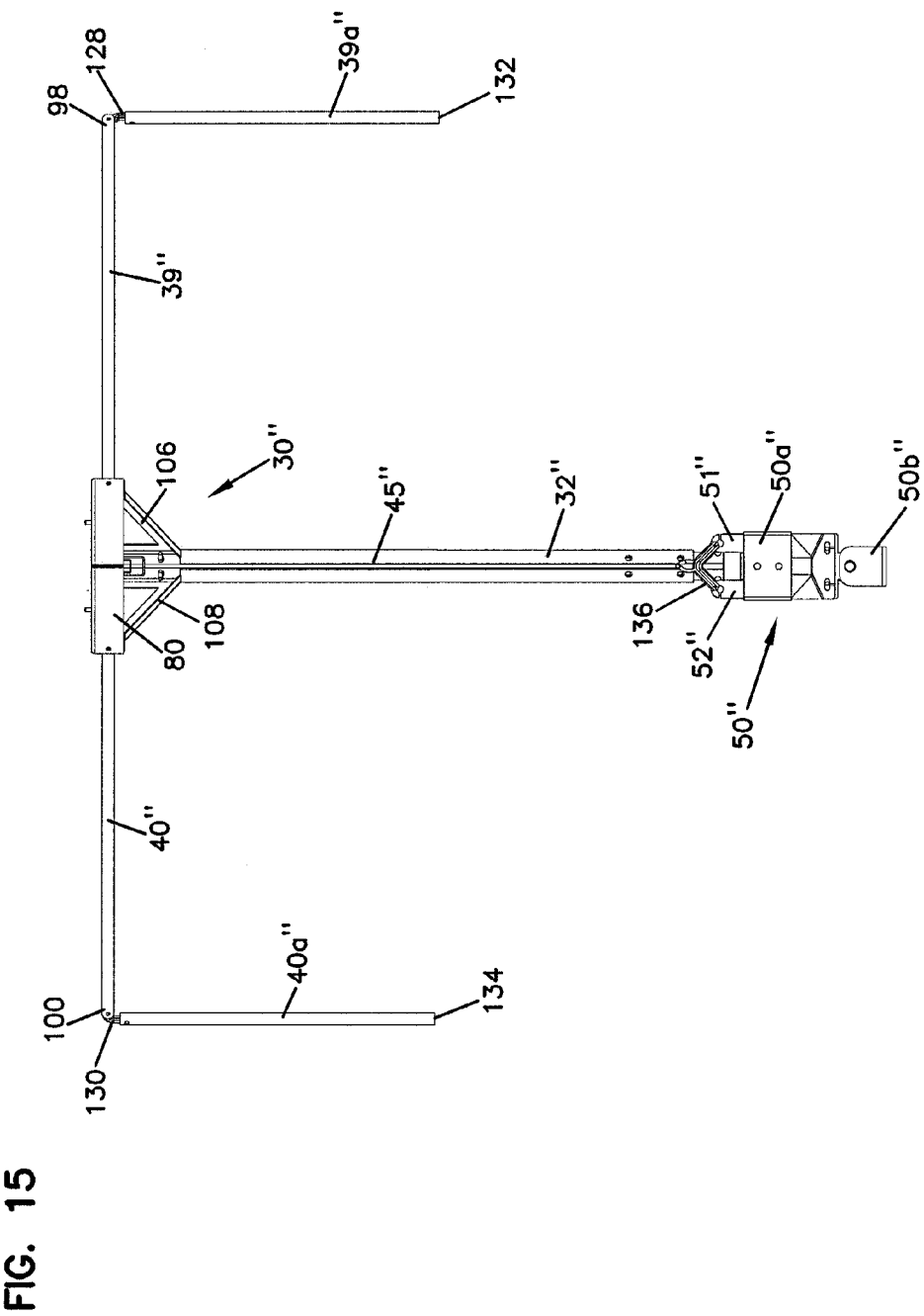
FIG. 15 is a rear view of the gate assembly of FIG. 12.

The general configuration and operation of the gate assembly of the third embodiment parallels that of the first two embodiments with several differences. Referring to FIG. 11, as in the second embodiment, the full support frame 12 is not present. The gate 15" is bolted by means of its hinges 16" directly to a support post 20" of the fence. As in the second embodiment, at the distal end of the gate 15", the latching mechanism 50" operates to selectively secure the gate 15" to the second fixed post 21" of the fence. The horizontal post member 53" of the second latch portion 50b" is secured directly to the second fixed post 21" of the fence, and the first latch portion 50a" is connected as in the first and second embodiments to the moveable end of the gate 15".

One difference reflected in the third embodiment of the invention versus that described for the first two embodiments is that, in the third embodiment, the lever arms 39", 40" have to be pushed upwardly to release the latch assembly 50", as will be described in further detail below. Also, unlike the first two embodiments, the third embodiment of the gate assembly illustrated does not include a pivot control mechanism with a retainer arm (60, 60') for pivoting the operating lever arms 39", 40" out of the way. However, it should be noted that, if desired, a pivot control mechanism can certainly be included in the third embodiment of the gate assembly as in the first two embodiments.

Referring to FIGS. 11-19, the third embodiment of the gate release assembly includes an upright channel mast member 32" that extends between a pivotal operator control mechanism of the gate release assembly 30" and the latch assembly 50". The upright channel mast member 32", as in the first embodiment, is configured for cooperative attachment to the right upright member 15b" of the gate 15". The open channel portion of the upright mast member 32" is sized to cooperatively slide over the right upright member 15b" of the gate 15" in snug mating relation as illustrated in FIG. 11. The gate release assembly 30" also has fastening flange portions 32a" adjacent the lower end of the mast member 32" which are secured in snug mating relation with the lateral bars 15*c*" of the gate, as illustrated in FIG. 11. It should be noted that the upright mast member 32" may be configured such that it is adjustable in height with respect to the gate 15". In certain embodiments, the upright mast member may have a plurality of mounting locations for mounting on the upright member 15*b*" of the gate for varying the overall height of the gate release assembly. And, in certain embodiments, the upright mast member 32" may include telescoping portions that slide relative to a main portion to raise and lower the overall height of the gate release assembly relative to the gate. In this manner, depending on the kinds of animals that are being kept by the gate, the height of the upright mast member 32" and, thus, the height of the gate release assembly may be adjusted accordingly to the desired height.

Referring to FIGS. 11-20, the pivotal operator control mechanism 30" is provided adjacent the upper distal end 32*b*" of the upright mast member 32". The operator control mechanism 30" includes a housing portion 80. A bottom perspective view of the housing 80 of the pivotal operator control mechanism 30" is shown in closer detail in isolation in FIG. 19. The housing 80 includes a generally square shaped top plate 82 that has a top side 84 and a bottom side 86. The top plate 82 includes downwardly extending first and second side skirt portions 88, 90, respectively, adjacent ends of which meet at a corner at a rear end 92 of the top plate 82 (see FIG. 19). At front ends of the side skirt portions 88, 90 are provided first and second pivot brackets 94, 96, respectively, for the cantilevered extending lever arms 39" and 40".

The lever arms 39" and 40" include first distal ends 98, 100, respectively, and second, non-handle ends 39*b*", 40*b*" respectively. The lever arms 39", 40" are pivotally supported by first and second pivot brackets 94, 96, respectively. The lever arms 39", 40" extend through the pivot brackets 94, 96 and extend to the rear end of the housing 80. The lever arms 39", 40" pivot about pins 95 extending through holes 102, 104 in the first and second pivot brackets 94, 96 and extending through the side skirt portions 88 and 90 (see FIGS. 18 and 19). The lever arm pivot brackets 94, 96 are reinforced with two triangular support brackets 106, 108 that extend between the pivot brackets 94, 96 and the upright mast member 32", which extends downwardly from a front end 110 of the top plate 82. It should be noted that all of the components of the housing 80 may either be welded together or attached to each other using other types of attachment means such as fasteners, etc.

Welded to the bottom of the top plate 82, toward the rear end 92 of the top plate 82, is a tumble bar pivot bracket 112. The tumble bar pivot bracket 112 pivotally supports a tumble bar 114 about a pivot pin 113 through a pivot hole 119. The tumble bar 114 is shown in closer detail in FIG. 20 in isolation. The tumble bar 114 includes a front end 116 and a rear end 118. The front end 116 of the tumble bar 114 is coupled to the latch members 51", 52" of the latch assembly 50" via a latch rod 45". At the rear end 118 of the tumble bar 114 is a rear flange member 120. The rear flange member 120 is configured to be positioned underneath the second distal ends 39*b*", 40*b*" of the lever arms 39", 40" such that the pivoting motion of the lever arms 39", 40" causes the second ends 39*b*", 40*b*" of the lever arms 39", 40" to push the flange member 120, thus, the rear end 118 of the tumble bar 114 downwardly. As the rear end 118 of the tumble bar 114 is pushed down, the front end 116 of the tumble bar 114 is pivoted up about the pivot pin 113, pulling on the latch rod 45" which is connected to the latch members 51", 52".

In the embodiment of the operator control mechanism shown, the rear flange member 120 is depicted as a circular washer that is welded to the rear end 118 of the tumbler bar 114 but it should be noted that other structures may be used. The top plate 82 of the housing 80 includes a hole 122 above the connection location of the latch rod 45" to the tumble bar 114 to accommodate a protruding end 124 of the latch rod 45" when the front end 116 of the tumble bar 114 pivots upwardly. The latch rod 45" can be coupled to the front end 116 of the tumble bar 114 in a number of ways including via fasteners. For example, the end of the latch rod 45" that is coupled to the tumble bar could be threaded to receive a nut after being inserted through the hole 115 defined at the front end 116 of the tumble bar 114. Also, in certain embodiments, the latch rod 45" and the tumble bar 114 may be coupled to each other in an adjustable fashion wherein the length of the latch rod may be adjusted. The pivot range of the tumble bar 114 is limited by a bottom plate 126 of the pivot bracket 112, wherein the tumble bar 114 contacts the bottom plate 126 of the pivot bracket 112 to stop the pivoting movement of the tumble bar 114, whether it be upward pivoting or downward pivoting.

Figure 16:
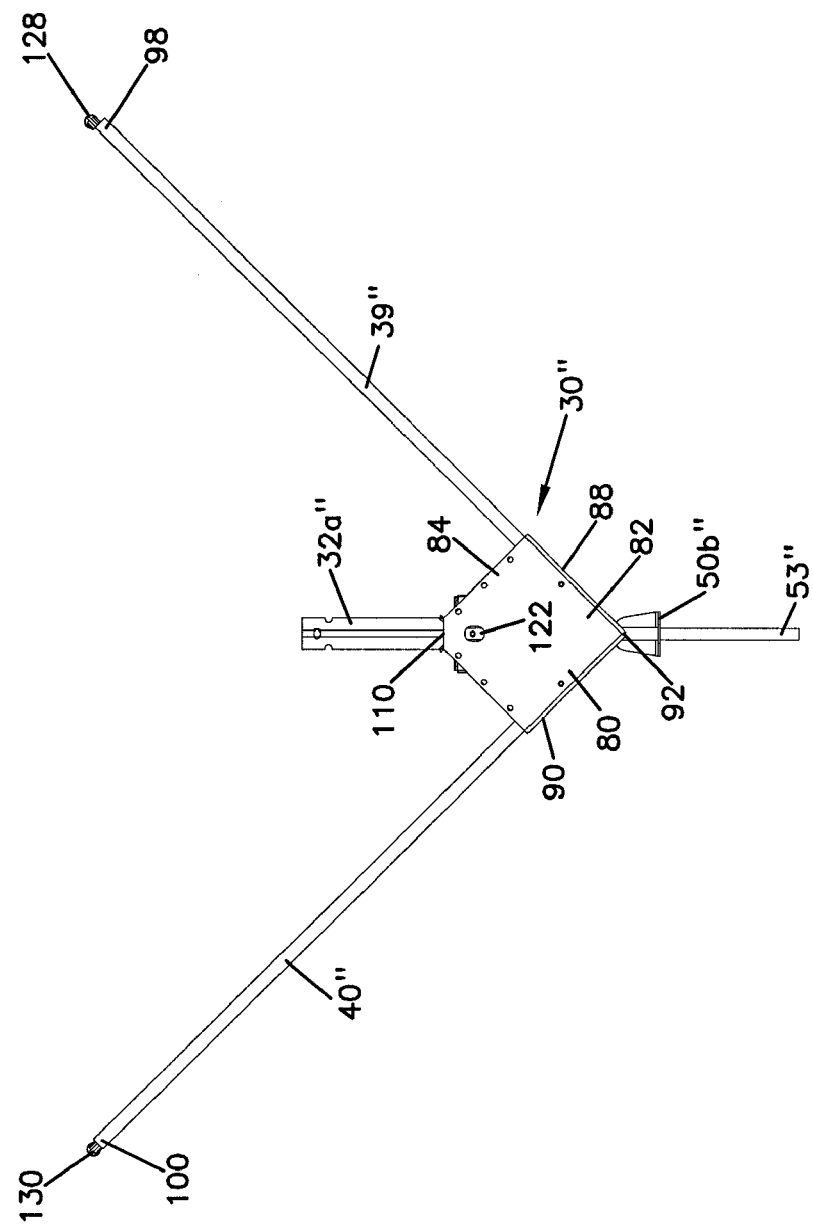
FIG. 16 is a top view of the gate assembly of FIG. 12.
Figure 17:
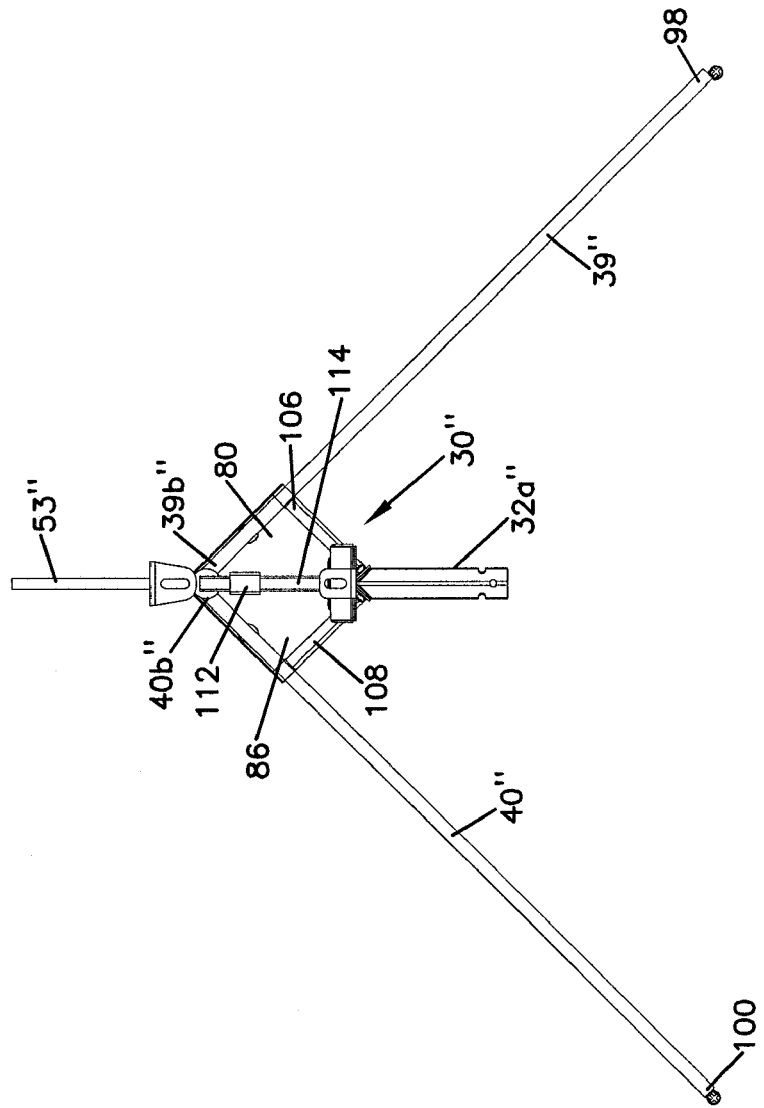
FIG. 17 is a bottom view of the gate assembly of FIG. 12.
Figure 18:
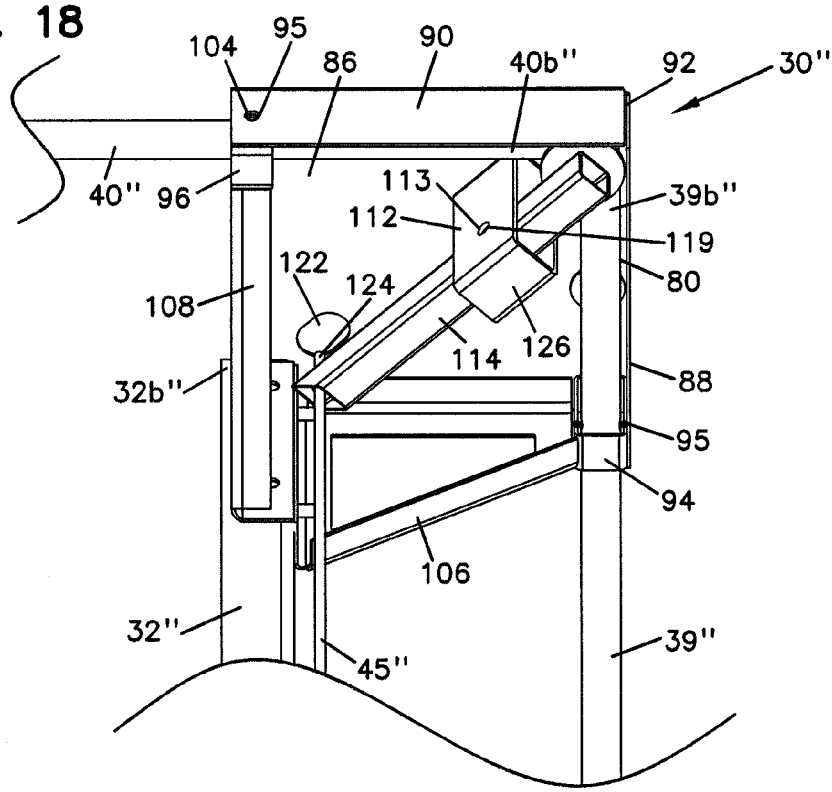
FIG. 18 is an enlarged perspective view of the pivotal operator control mechanism of the gate assembly of FIG. 13.

The lever arms 39", 40" of the operator control mechanism are pivotally secured to the pivot brackets 94, 96 and longitudinally extend outwardly therefrom toward their first ends 98, 100, forming generally a right angle therebetween (as viewed from above in FIG. 16). In a preferred embodiment, the lever arms 39", 40" generally extend in a horizontal plane when in a standby (non-operating) mode; however, they need not be horizontal but could extend at a certain angle to the ground. For example, in certain embodiments, the lever arms 39", 40" could extend at angles of 15° or more off of a horizontal plane.

At the first distal ends 98, 100 of the lever arms 39", 40" are handles 39*a*" and 40*a*", respectively, of the first and second lever arms 39" and 40". The handles 39*a*", 40*a*" are coupled to the first distal ends 98, 100 of the lever arms 39", 40" via chain links 128, 130, respectively. The handles 39*a*", 40*a*" swing freely from the lever arms 39", 40" via the chain links 128, 130 and are allowed to freely pivot with respect to the distal ends 98, 100 of the lever arms 39", 40" at all directions. The connection provided by the chain links 128, 130 are such that one would have a difficult time pivoting the lever arms 39", 40" upwardly unless the handles 39*a*", 40*a*" were grasped and pushed upwardly at their unattached ends 132, 134 by first stiffening up the connection between the lever arms 39", 40" and the handles 39*a*", 40*a*". According to one method of stiffening the connection, the handles 39*a*", 40*a*" could be grasped and pushed generally upwardly (either directly upwardly or at an angle) far enough such that the chain links 128, 130 start pulling up on the lever arms 39", 40". Another method would be to grasp and rotate the lever arms 39", 40" about longitudinal axes L of the handles to stiffen up the connection between the handles 39*a*", 40*a*" and the lever arms 39", 40" and push up on the handles 39*a*", 40*a*".

The handles 39*a*", 40*a*" are connected via the chain links 128, 130 in a loose manner such that the connection has to be stiffened first before the levers 39", 40" can be pushed up. As discussed above, one way to accomplish this is to rotate the handles 39*a*", 40*a*" about their longitudinal axes L to lock the chain links together in a manner so as to stiffen-up the connection between the lever arms 39", 40" and the handles 39*a*", 40*a*" and pivot the lever arms 39", 40" upwardly using the stiff connection. Another way to accomplish this is to grasp and push the handles 39*a*", 40*a*" generally upwardly (either directly upwardly or at an angle) far enough such that the chain links 128, 130 start pulling generally upwardly on the lever arms 39", 40".

The lever arms 39", 40" are preferably positioned at a height such that a typical standing or walking horse cannot reach the lever arms 39", 40" with its mouth when in a standard walking or standing (all four legs on the ground) position. For purposes of the present description and the invention, a typical horse, according to the invention, is generally defined to be from about 5 feet to 9 feet tall including the head, in a standard walking or standing position. According to a more preferred definition, a typical horse may be between about 6 feet and about 8 feet tall including the head, in a walking position. According to the most preferred definition, a horse would be between about 6.5 feet and about 7.5 feet tall including the head, in a walking position. A typical horse may be able to reach objects with its mouth that are up to about 1 feet to 1.5 feet above its head by raising its head.

The handles 39a", 40a" are preferably located at a height such that a rider on a horse is able to reach the handles 39a", 40a". This may mean that the handles 39a", 40a" may be within the reach of the horse's head or the mouth. However, as discussed above, the gate release assembly is configured such that, even if a horse was able to reach the handles 39a", 40a" with its mouth, the horse would have a difficult time pivoting up the lever arms 39", 40" since the handles 39a", 40a" hang loosely and would tend to swing in numerous directions with respect to the lever arms 39", 40". A horse would have to tightly grasp either of the handles 39a", 40a" and push upwardly far enough to have the chain links 128, 130 pull up on the lever arms 39", 40", which would be difficult for a horse to do since it requires an upward movement of the head and the neck of the horse in addition to a strong hold on the handles 39a", 40a". However, a human could operate the gate release assembly by stiffening up the connection between the handles 39a", 40a" and the levers 39", 40" by, for example, rotating the handles 39a", 40a" about their longitudinal axis and pivoting up the lever arms 39", 40" by pushing up on the handles 39a", 40a". In this manner, the design of the operator control mechanism makes it difficult for an animal such as a horse to be able to use its mouth to open the gate 15", while allowing a human sitting on a horse or a vehicle such as an ATV or tractor to be able to unlatch the gate 15".

While the connection between the lever arms 39", 40" and the handles 39a", 40a" is shown to be established with chain links 128, 130, it will be understood that other types of connection members such as cables, ropes or the like that may stiffen up and provide a solid connection when rotated or pushed up or pulled up far enough could also be used to form a linkage between the lever arms 39", 40" and the handles 39a", 40a".

When the first ends 98, 100 of the lever arms 39", 40" are pushed upwardly, the lever arms 39", 40" pivot about their pivot pins 95 within the pivot brackets 94, 96 and the second ends 39b", 40b" of the lever arms 39", 40" pivot down. The downward motion of the second ends 39b", 40b" of the lever arms 39", 40" pushes the rear end 118 of the tumble bar 114 downwardly. As the rear end 118 of the tumble bar 114 is pushed down, the front end 116 of the tumble bar 114 is pivoted up, pulling on the latch rod 45" which is connected to the latch members 51", 52" of the latch assembly 50".

Figure 21:
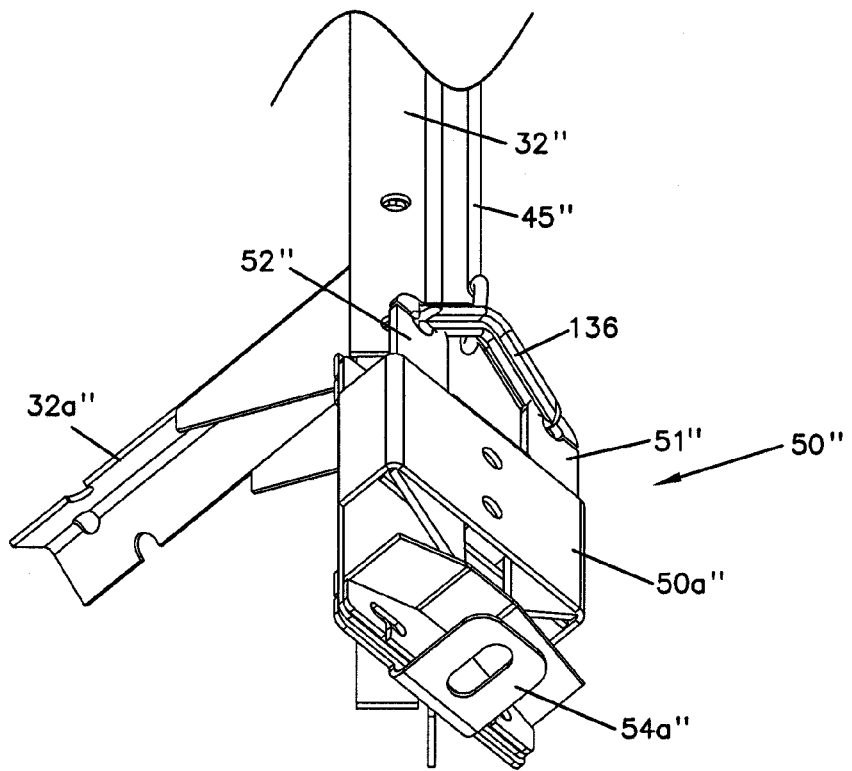
FIG. 21 is an enlarged perspective view of the latch portion of the gate assembly of FIG. 13.
Figure 19:
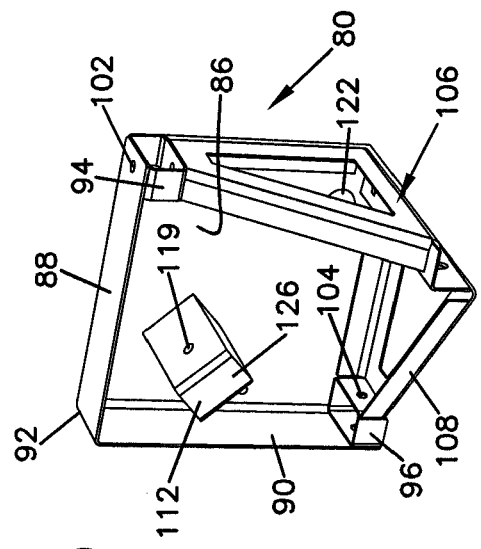
FIG. 19 is a bottom perspective view of a housing of the pivotal operator control mechanism of the gate assembly of FIG. 18.
Figure 20:
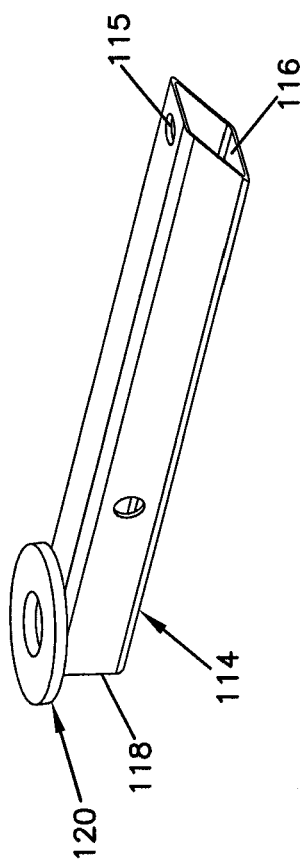
FIG. 20 is a top perspective view of a tumble bar of the pivotal operator control mechanism of the gate assembly of FIG. 18.

Referring to FIG. 21, the latch assembly 50" is attached adjacent the lower end of the upright mast member 32". The latch assembly 50" is similar to the latch assembly of the first two embodiments. One difference reflected in the third embodiment of the latch assembly 50" is that the movable latch members 51" and 52" are lifted together at the same time by the latch rod 45" when either of the lever arms 39" and 40" is pivoted. However, this configuration can certainly be changed if desired. The latch rod 45" is attached to the latch members 51" and 52" by a chain link 136 and applies a pulling force on both of the latch members 51" and 52" at the same time, lifting both at the same time. In the design of the operator control mechanism, both of the lever arms 39" and 40" apply a force on the same part, the tumble bar 114, which is connected to the latch members 51" and 52" with the single latch rod 45".

As mentioned previously, the post member 53" of the second latch portion 50b" is secured to the second fence post 21". In certain embodiments, the post member 53" may extend through the second fence post 21" and have a portion protruding out from the second fence post 21" that is captured between the movable latch members 51" and 52" to latch the gate 15". The post member 53" may also be secured to the second fence post 21" by bolts, brackets, or other fasteners (not shown).

The latch assembly 50" of the third embodiment, as in the first two embodiments, also includes lock members 54a" and 54b" to provide the gate 15" with a locking capability. As in the first two embodiments, the locking member 54a" forms an extension of the first latch portion 50a" and is affixed to the end of the upright channel mast member 32" which is coupled to and moves with the gate 15". Locking member 54b" is secured to the second fence post 21". In their simplest form, the lock members 54a" and 54b" comprise overlapping flange extensions with vertically aligned holes formed therethrough for cooperatively accepting a locking pin, padlock or the like, in a manner well-known in the art.

Operation of the third embodiment of the gate release assembly 30" can be discussed with reference to FIGS. 11-21. Referring thereto when the gate 15" is disposed in a closed and latched position the gate 15" will appear as in FIG. 11, wherein the lever arms 39" and 40" are pivotally positioned in their at rest or neutral, generally horizontal positions with the handles 39a", 40a" downwardly hanging and swinging freely from the first ends 98, 100 of the lever arms 39", 40". The latch members 51" and 52" of the latch assembly 50" are also positioned in their lowermost positions as illustrated in FIG. 11, retainably engaging the latch post member 53", thus securing the gate 15" in latched position. As an operator, for example a rider on a horse, approaches the gate 15", one of the operator lever arms 39"or 40"will be available to him/her on that side of the gate 15" from which he/she approaches. If, for example, the operator approaches from that side of the gate 15" on which operator lever arm 39" is located, he/she need merely to lift an arm and grasp the handle 39a" of the lever arm 39" and, for example, twist it relative to the longitudinal axis L of the handle 39a" to stiffen up the connection between the handle 39a" and the lever arm 39". Thereafter, once a solid connection is provided between the lever arm 39" and the handle 39a", the lever arm 39" can be pushed upwardly by the operator, causing the lever arm 39" to pivot about the pivot bracket 94. The second end 39b" of the lever arm 39" moves downwardly to push down on the tumble bar 114, causing the tumble bar 114 to pivot within the tumble bar pivot bracket 112. The pivoting motion of the tumble bar 114 causes the front end 116 of the tumble bar 114 to move upwardly and lift the latch rod 45", lifting the liftable latch members 51" and 52" of the latch assembly 50", thereby releasing the first latch portion 50a" from engagement with the post member 53" of the second latch portion 50b". The gate 15" is now free to swing open. Typically, the operator will swing open the gate by exerting continued force on the handle 39" in a direction having a horizontal force vector, to cause the gate 15" to pivotally open about its hinges 16".

In one sample operation, when the rider progresses through the gate 15" he/she can close the gate 15" by grasping the handle 40a", twisting it to create a solid connection between the handle 40a" and the lever arm 40", and pushing the gate 15" in a direction back toward a closed position with the handle 40a". Alternatively, the operator could simply push the gate shut by pushing on the upright mast member 32".

As the gate 15" approaches the closed position the outer cammed surface of the liftable latch member 51" will engage the outer surface of the post member 53", causing the moveable latch member 51" to lift up and over the post member 53". As the post member 53" passes beneath the first lifted latch member, the latch member 51" will drop back down to a latching position, thereby securing the gate 15" in a closed, latched condition.

It should be noted that the handles 39a", 40a" may provide enough weight to the lever arms 39", 40" to weigh down the lever arms 39", 40" to keep the lever arms 39", 40" in a neutral position, keeping the front end 116 of the tumble bar 114 in a generally horizontal position to keep the latch members 51" and 52" in a dropped position to keep the gate 15" in a closed, latched position. The operator lever arms 39" and 40" need not be activated during the closing operation, since the cammed latch liftable members 51" and 52" perform a self-closing and latching function, without operator intervention.

It can be appreciated, therefore, that an improved gate assembly has been disclosed which enables ease of operation for a person riding on a horse or other animal or upon an elevated vehicle such as a tractor or ATV, without requiring dismounting from the horse or vehicle. It will also be appreciated that an improved gate assembly has been described which while easily operable by a person, cannot easily be opened or operated by animals such as horses, livestock or the like. It will be appreciated that while the invention has been disclosed with respect to embodiments that show three sets of latch activating members that enable opening of a gate from either side of the gate, the invention would apply equally well to gate opening arrangements wherein the latch activating assembly is configured on only one side of the gate. It will also be appreciated that while the invention has been disclosed with particular embodiments which require pushing the gate closed, once opened, the gate could also be automatically closed by force applying members such as hydraulic cylinders, springs or other such devices.

While the invention has been described with respect to preferred embodiments thereof, and with respect to specific types and shapes of components and materials used therein in association with, and with particular sized components, it will be understood by those skilled in the art that the invention is not to be limited in any manner by the specifics of either the described embodiments, materials, component sizes or shapes. Such embodiments, materials, sizes, and the like have been described to indicate clear examples of how the principals of the invention can be specifically applied to a gate assembly. All alternatives and modifications of the forgoing are intended to be covered within the broad scope of the appended claims.

I claim:

1. A gate release assembly for use with a gate that includes a latch, the gate release assembly comprising:
   a latch control mechanism configured to be operatively coupled to a latch such that activation of the latch control mechanism releases the latch, the latch control mechanism including a first lever, wherein pushing up on the first lever releases the latch, the latch control mechanism including a first handle with a longitudinal axis, the first handle being coupled to the first lever via a loose mechanical connection such that the first handle cannot be used to push up on the first lever unless the connection between the first lever and the first handle is stiffened, the latch control mechanism further including a tumble bar defining a front portion and a rear portion, the tumble bar being pivotal about a pivot point such that when the rear portion of the tumble bar is pushed downwardly, the front portion of the tumble bar is pivoted upwardly, the tumble bar being coupled to the latch with a latch rod at the front portion of the tumble bar and the tumble bar defining a flange at the opposite rear portion of the tumble bar, wherein the first lever is operatively arranged with respect to the tumble bar such that pushing up on the first lever pushes down on the flange of the tumble bar, pivoting the rear portion of the tumble bar downwardly and pivoting the front portion of the tumble bar upwardly, pulling up on the latch rod to release the latch.

2. A gate release assembly according to claim 1, wherein the connection between the first lever and the first handle is capable of being stiffened to push up on the first lever by rotating the first handle about its longitudinal axis.

3. A gate release assembly according to claim 1, wherein the latch control mechanism comprises the first lever and a second lever that are each operatively coupled to the latch, the first lever being configured to extend outwardly on a first side of a gate to facilitate activation of the first lever and release of the latch from the first side of the gate, the second lever being configured to extend outwardly on a second side of the gate to facilitate activation of the second lever and release of the latch from the second side of the gate.

4. A gate release assembly according to claim 1, wherein the first handle is coupled to the first lever with a chain link.

5. A gate release assembly for use with a gate that includes a latch, the gate release assembly comprising:
   a latch control mechanism configured to be operatively coupled to a latch such that activation of the latch control mechanism releases the latch, the latch control mechanism including a first lever that is positioned generally horizontal to the ground, wherein pushing up vertically on the first lever releases the latch, the latch control mechanism including a first handle coupled to the first lever, wherein the first handle hangs down from the first lever in a generally vertical direction such that the first handle is capable of freely swinging relative to the first lever in all directions, the latch control mechanism further including a tumble bar defining a front portion and a rear portion, the tumble bar being pivotal about a pivot point such that when the rear portion of the tumble bar is pushed downwardly, the front portion of the tumble bar is pivoted upwardly, the tumble bar being coupled to the latch with a latch rod at the front portion of the tumble bar and the tumble bar defining a flange at the opposite rear portion of the tumble bar, wherein the first lever is operatively arranged with respect to the tumble bar such that pushing up on the first lever pushes down on the flange of the tumble bar, pivoting the rear portion of the tumble bar downwardly and pivoting the front portion of the tumble bar upwardly, pulling up on the latch rod to release the latch.

6. A gate release assembly according to claim 5, wherein the first handle is coupled to the first lever with a chain link.

7. A gate release assembly according to claim 5, wherein the latch control mechanism comprises the first lever and a second lever that are each operatively coupled to the latch, the first lever being configured to extend outwardly on a first side of a gate to facilitate activation of the first lever and release of the latch from the first side of the gate, the second lever being configured to extend outwardly on a second side of the gate to facilitate activation of the second lever and release of the latch from the second side of the gate.

* * * * *